(12) United States Patent
Gonzales

(10) Patent No.: US 8,004,605 B1
(45) Date of Patent: Aug. 23, 2011

(54) MOBILE CAMERA STAND

(76) Inventor: Rolando Gonzales, San Diego, CA (US)

( * ) Notice: Subject to any disclaimer, the term of this patent is extended or adjusted under 35 U.S.C. 154(b) by 0 days.

(21) Appl. No.: 12/651,281

(22) Filed: Dec. 31, 2009

Related U.S. Application Data

(63) Continuation-in-part of application No. 11/697,775, filed on Apr. 9, 2007, now Pat. No. 7,692,718, which is a continuation-in-part of application No. 11/459,148, filed on Jul. 21, 2006, now Pat. No. 7,616,887.

(51) Int. Cl.
*H04N 5/225* (2006.01)

(52) U.S. Cl. .................... 348/376; 396/423

(58) Field of Classification Search ................ None
See application file for complete search history.

(56) References Cited

U.S. PATENT DOCUMENTS

| | | | | |
|---|---|---|---|---|
| 2,806,416 | A * | 9/1957 | Jones, Jr. ................... | 294/139 |
| 4,963,904 | A * | 10/1990 | Lee ......................... | 396/423 |
| 5,243,370 | A * | 9/1993 | Slater ....................... | 352/243 |
| 6,705,578 | B2 * | 3/2004 | Mulford et al. ............ | 248/187.1 |
| 7,000,879 | B2 | 2/2006 | Gonzales | |
| 7,097,368 | B2 | 8/2006 | Gonzales | |
| 7,372,502 | B2 | 5/2008 | Gonzales | |
| 7,488,126 | B2 | 2/2009 | Gonzales | |
| 2004/0208498 | A1 * | 10/2004 | McKay ..................... | 396/421 |
| 2005/0067543 | A1 * | 3/2005 | Gonzales ................... | 248/298.1 |
| 2005/0069312 | A1 * | 3/2005 | Gonzales ................... | 396/421 |
| 2005/0157182 | A1 * | 7/2005 | Gonzales ................... | 348/208.99 |
| 2005/0258660 | A1 * | 11/2005 | Wu .......................... | 294/139 |
| 2006/0124814 | A1 * | 6/2006 | Gonzales ................... | 248/298.1 |

* cited by examiner

*Primary Examiner* — Lin Ye
*Assistant Examiner* — Dennis Hogue
(74) *Attorney, Agent, or Firm* — Frank G. Morkunas

(57) ABSTRACT

A mobile camera stand having a receiver with a receiver top to which a non-pivoting telescoping arm is attached, a receiver bottom with a locking member to which a non-telescoping arm is removably attachable, and a receiver pivotable section to which a pivoting telescoping arm is attached. The distal ends of each telescoping arm are adapted to attach to a camera or a camera platform. An adjustable upper connecting member is removably attachable to the non-pivoting arm and adjustably and removably attachable to a user. An adjustable lower connecting member is removably attachable to the non-telescoping arm and adjustably and removably attachable to a user.

13 Claims, 3 Drawing Sheets

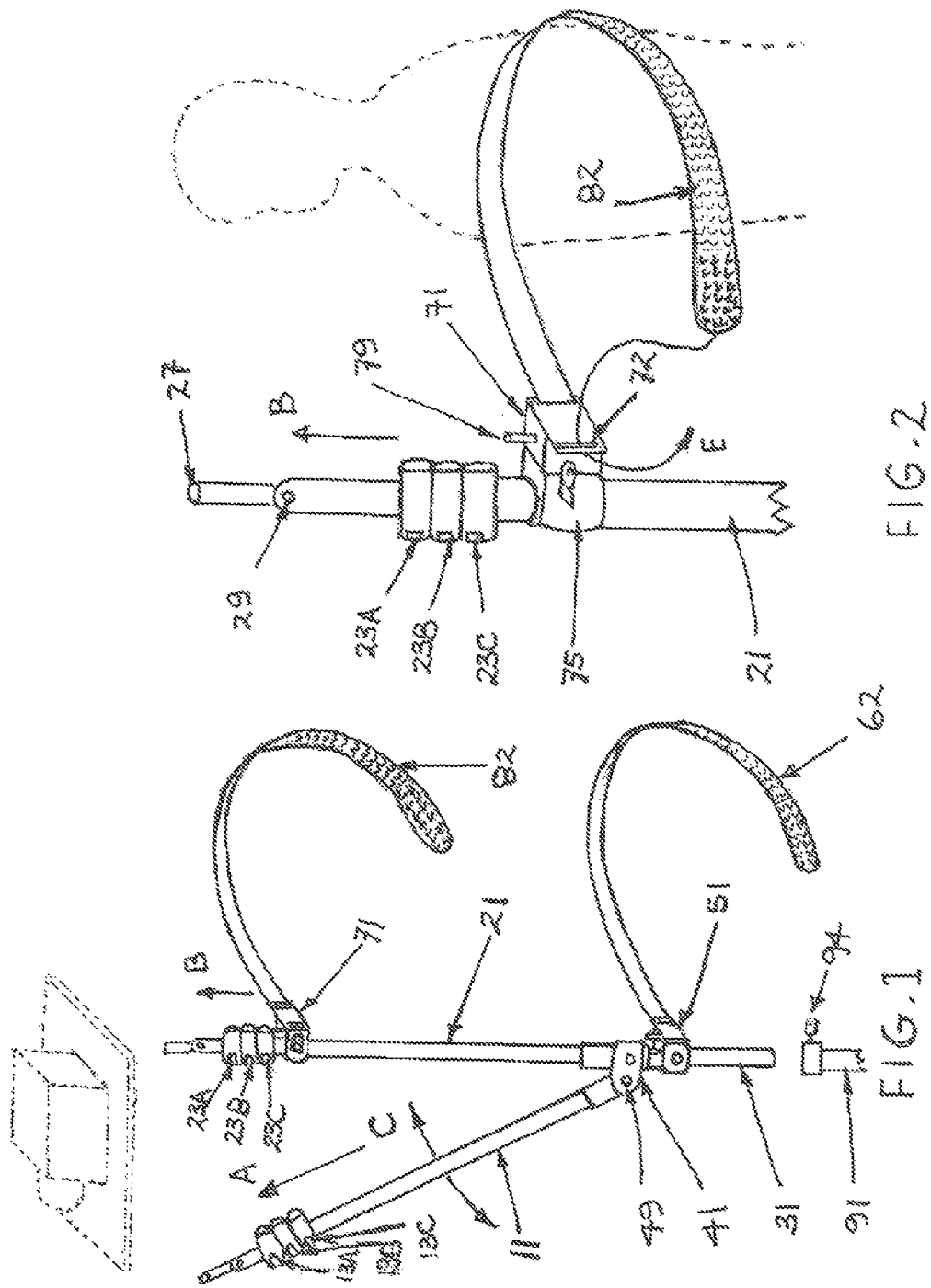

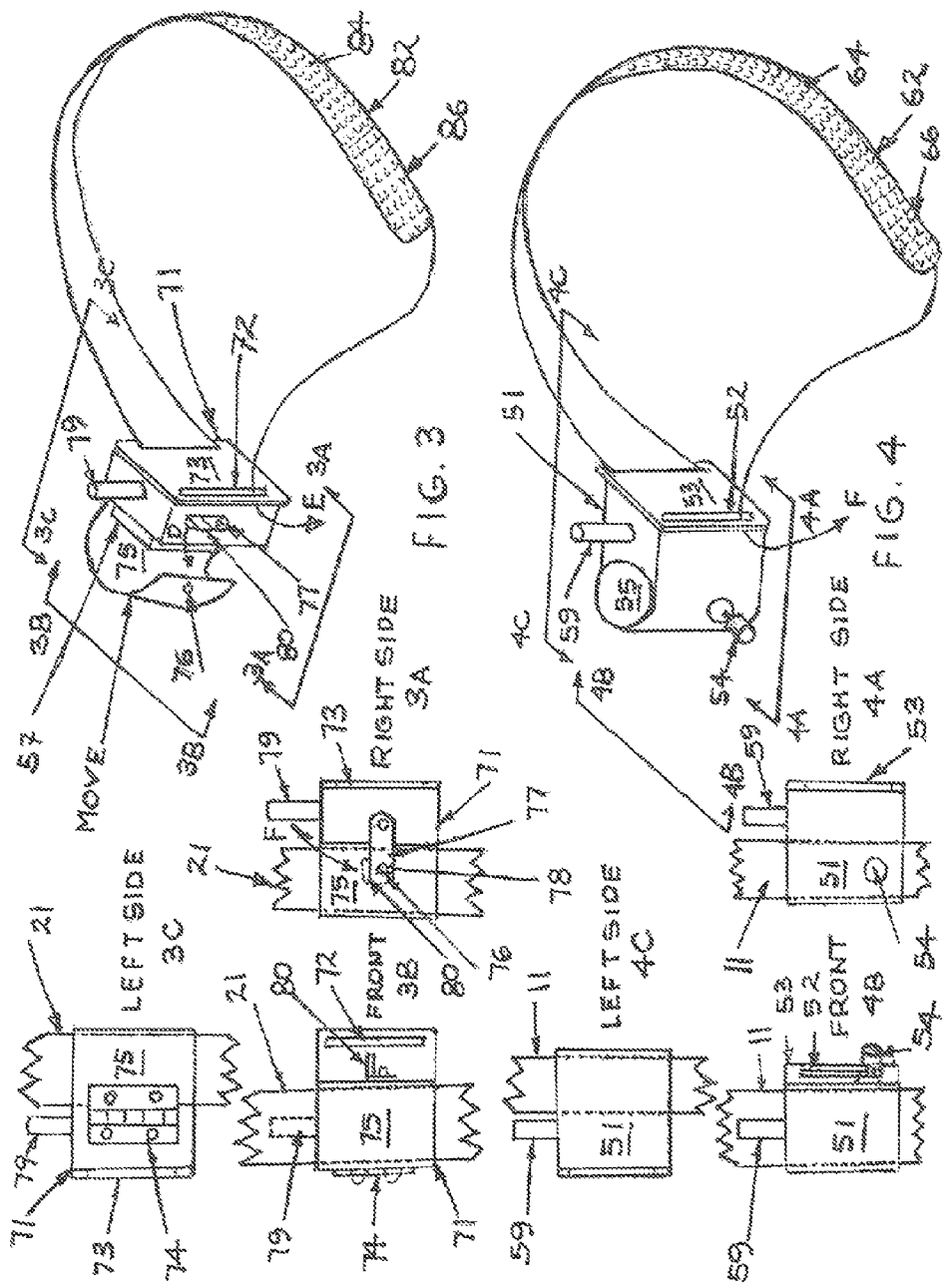

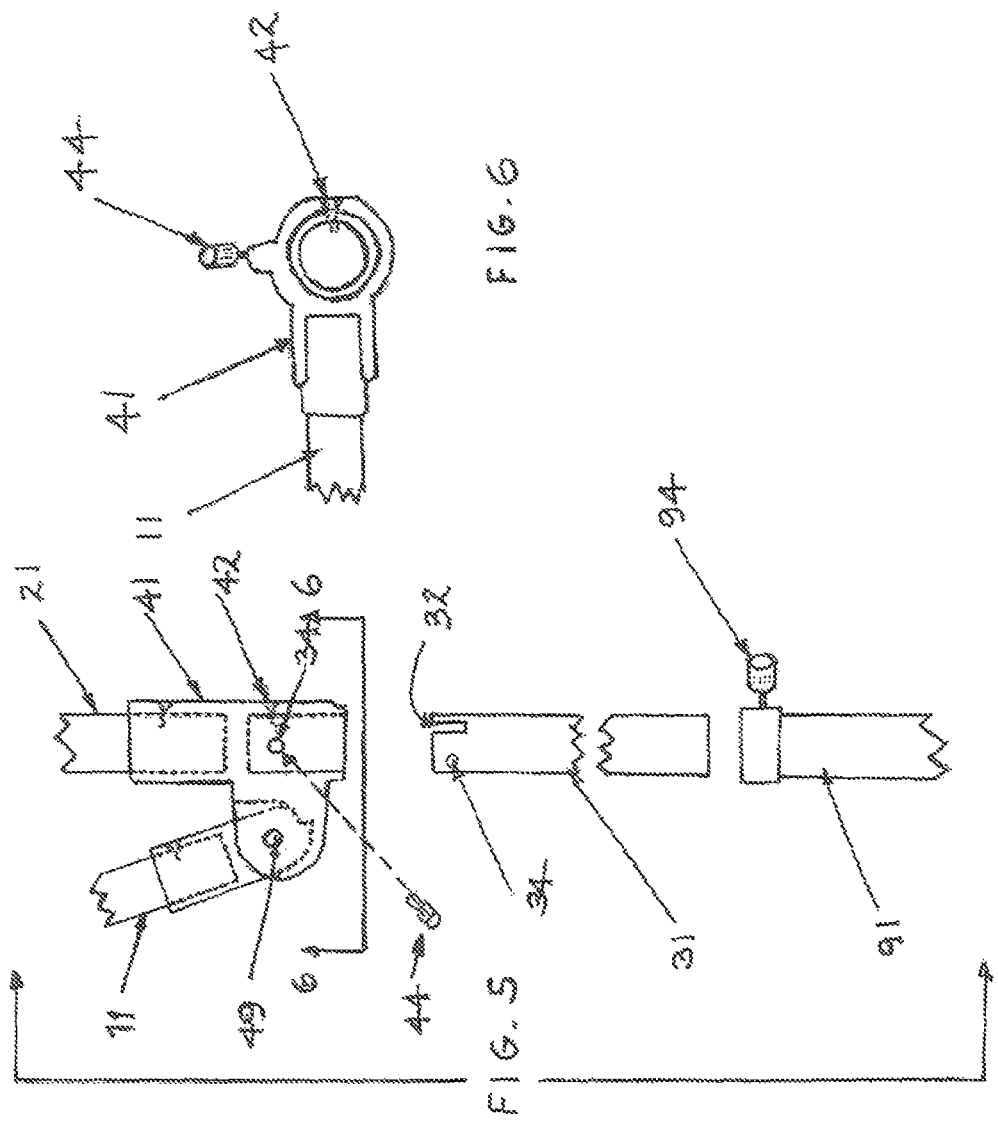

MOBILE CAMERA STAND

CROSS REFERENCES TO RELATED APPLICATIONS

This application is a continuation-in-part of my application, application Ser. No. 11/697,775, filed on Apr. 9, 2007 now U.S. Pat. No. 7,692,718, which was a continuation-in-part of my prior application, application Ser. No. 11/459,148, filed on Jul. 21, 2006, now U.S. Pat. No. 7,616,887 which issued on Nov. 10, 2009. The above-referenced application is hereby incorporated by reference into this application.

STATEMENT REGARDING FEDERALLY-SPONSORED RESEARCH OR DEVELOPMENT

Not applicable.

BACKGROUND

This mobile camera stand for of the present disclosure relates to an improvement in camera stands, holders, and stabilizers [hereinafter referred to as "platform" or "camera platform"], and more particularly to devices designed to accept a camera or a platform for a camera with or without said camera thereon for the purpose of generating, as necessary, photographs or videos which are more professional in quality and having less blurring or jittery in nature.

As set forth in my previous patents and current co-pending application:
U.S. Pat. No. 7,000,879 issued on Feb. 21, 2006;
U.S. Pat. No. 7,097,368 issued on Aug. 29, 2006;
U.S. Pat. No. 7,372,502 issued on May 13, 2008;
U.S. Pat. No. 7,488,126 issued on Feb. 10, 2009; and
application Ser. No. 11/697,775 filed on Apr. 9, 2007;
there were many problems associated with prior art camera holders and stabilizers for properly holding and stabilizing a camera for better and more professional pictures and videos, for maintaining properly lighting, and establishing better positioning for the absolute best picture or video.

The problems noted in the above-referenced patents and application, and the descriptions therein, are hereby incorporated by reference into this current application.

This current mobile camera stand is a vast improvement in all the prior art devices in that it is easier to use, easier to store, easier to assemble and dis-assemble, more sturdy and flexible as to adjustment, and can accommodate virtually any body camera or platform in its operation.

The foregoing has outlined some of the more pertinent objects of the mobile camera stand of the present disclosure. These objects should be construed to be merely illustrative of some of the more prominent features and applications of the mobile camera stand of the present disclosure for a camera or platform. Many other beneficial results can be attained by applying the disclosed mobile camera stand of the present disclosure for a camera or platform in a different manner or by modifying the mobile camera stand of the present disclosure for a camera or platform within the scope of the disclosure.

Accordingly, other objects and a fuller understanding of the mobile camera stand of the present disclosure for a camera or platform may be had by referring to the summary of the mobile camera stand of the present disclosure for a camera or platform and the detailed description of the preferred embodiment in addition to the scope of the mobile camera stand of the present disclosure for a camera or platform defined by the claims taken in conjunction with the accompanying drawings.

SUMMARY

The above-noted problems, among others, are overcome by the mobile camera stand of the present disclosure for a camera or platform. Briefly stated, the mobile camera stand contemplates a receiver having a receiver top to which a non-pivoting telescoping arm is attached, a receiver bottom with a locking member to which a non-telescoping arm is removably attachable, and a receiver pivotable section to which a pivoting telescoping arm is attached. The distal ends of each telescoping arm are adapted to attach to a camera or a camera platform.

The receiver bottom has a registration protrusion and a locking member. The non-telescoping arm has a registration slot at its top and an aperture. The slot mates with the protrusion and the locking member mates with the aperture to render a secure attachment.

An adjustable upper connecting member is removably attachable to the non-pivoting arm and adjustably and removably attachable to a user. Additionally, an adjustable lower connecting member is removably attachable to the non-telescoping arm and adjustably and removably attachable to a user.

The foregoing has outlined the more pertinent and important features of the mobile camera stand of the present disclosure in order that the detailed description that follows may be better understood so the present contributions to the art may be more fully appreciated. Additional features of the mobile camera stand of the present disclosure will be described hereinafter which form the subject of the claims. It should be appreciated by those skilled in the art that the conception and the disclosed specific embodiment may be readily utilized as a basis for modifying or designing other structures and methods for carrying out the same purposes of the mobile camera stand of the present disclosure. It also should be realized by those skilled in the art that such equivalent constructions and methods do not depart from the spirit and scope of the mobile camera stand of the present disclosure as set forth in the appended claims.

BRIEF DESCRIPTION OF THE DRAWINGS

For a fuller understanding of the nature and objects of the mobile camera stand of the present disclosure, reference should be had to the following detailed description taken in conjunction with the accompanying drawings in which:

FIG. 1 is an elevation view of the mobile camera stand.

FIG. 2 is a detailed view of second telescoping arm of the mobile camera stand.

FIG. 3 is a detailed view of the upper connecting member of mobile camera stand.

FIG. 3A as taken on line 3A-3A of FIG. 3 is a detailed right side view of the upper connecting member of the mobile camera stand.

FIG. 3B as taken on line 3B-3B of FIG. 3 is a detailed view of the front of the upper connecting member of the mobile camera stand.

FIG. 3C as taken on line 3C-3C of FIG. 3 is a detailed left side view of the upper connecting member of the mobile camera stand.

FIG. 4 is a detailed view of the lower connecting member of the mobile camera stand.

FIG. 4A as taken on line 4A-4A of FIG. 4 is a detailed right side view of the lower connecting member of the mobile camera stand.

FIG. 4B as taken on line 4B-4B of FIG. 4 is a detailed view of the front of the lower connecting member of the mobile camera stand.

FIG. 4C as taken on line 4C-4C of FIG. 4 is a detailed left side view of the lower connecting member of the mobile camera stand.

FIG. 5 is a detailed view of the pivotable receiver and third receiving arm of the mobile camera stand.

FIG. 6 as taken on line 6-6 of FIG. 5 is a detailed view of the pivotable receiver of the mobile camera stand.

DETAILED DESCRIPTION

Referring now to the drawings in detail and in particular to FIG. 1, reference character 10 generally designates a mobile camera stand constructed in accordance with a preferred embodiment of the mobile camera stand of the present disclosure.

This mobile camera stand of the present disclosure is compatible with various conventional and commercially available cameras [video or still] and camera stands, holders, and stabilizers, such as, but not limited to, the video camera monitor shield as described in my patent, U.S. Pat. No. 7,616,887, issued on Nov. 10, 2009, as well as the video camera light shield as described in my patent application, application Ser. No. 11/697,775, filed on Apr. 9, 2007, each of which have been incorporated herein by reference. For administrative clarity, the various stands, holders, stabilizers, and the like, are referred to as platform or camera platform.

The mobile camera stand has a pivotable receiver 41 with a pivotable section to which a first telescoping arm 11 is attached, a top to which a second telescoping arm 21 is attached, and a bottom for removably receiving a third arm 31. A pivot pin 49 associated with the connection point of the first telescoping arm 11 effects the pivotability of the first telescoping arm 11.

The first telescoping arm 11 has one or more extendable telescoping sections with locking member 13A, 13B, 13C, to lock the telescoping section in place, either extended [partially to fully to none] as needed. The second telescoping arm 21 also has one or more extendable telescoping sections with locking member 23A, 23B, 23C, also to lock the telescoping section in place, either extended [partially to fully to none, in the direction of Arrow-A for the first telescoping arm 11 and in the direction of Arrow-B for the second telescoping arm 21] as needed. As illustrated here, there are basically three sections but there could be more or less for the mobile camera stand 10. It should also be understood that the respective telescoping movement of each telescoping is bi-directional.

At the far [distal] end of each telescoping arm 11, 21, is a pivotable end member 17, 27, respectively, connected to each telescoping arm 11, 21 by a pivot pin 19, 29, respectively. Each distal end 17, 27 is adapted to be insertable into a camera 101 or a camera platform 100 and secured thereat. The pivotability of the first arm 11 [in the direction of Arrow-C, also bi-directional] assures proper alignment and fit to virtually any camera 101 or platform 100. The telescoping ability of both the first arm 11 and the second arm 21 allow for great flexibility of views, elevations, and angles while maintaining near perfect stability.

The third arm 31 removably attaches to the bottom of the pivotable receiver 41 and is securable thereto. Referring to FIGS. 5 and 6, the bottom of the pivotable receiver 41 has an inner protruding member 42 and a locking member 44 which when rotated presses into the opening noted in the bottom of the pivotable receiver 41. The third arm 31 also may be removably attachable to an external object 91 such as, but not limited to, a camera stand or tripod and the like.

The third arm 31 has a slot 32 at its top and an aperture 34 also at its top. The respective protruding member 42 and the slot 32 are registration components to ensure that the third arm 31 is properly received into the bottom of the pivotable receiver 41 such that the aperture 34 in the third arm 31 aligns with the locking member 44 of the pivotable receiver 41 so that the third arm 31 can be securely locked to the pivotable receiver 41.

Removability of the third arm 31 permits a user to attach the mobile camera stand 10 onto a free-standing tripod or other device adaptable to accept the pivotable receiver 41. Attachment of the third arm 31 to the pivotable receiver 41 permits the user to attach the mobile camera stand 10 onto any device adaptable to accept the third arm 31. This multi-functionality makes the mobile camera stand 10 extremely versatile.

FIGS. 3 and 4 illustrate in detail the upper connecting member 71 and the lower connecting member 51, respectively. The upper connecting member 71 has a body with a back plate 73 which extends on one end beyond the body exposing an elongated slot 72. Forward of the slot 72 is a swing arm 77 having a catch 78 therein. Extending outward of the swing arm 77 is an extension 80.

An elongated strap 82 is on the other end of the upper connecting member 71. The elongated has a fastening component 84 on one or both sides virtually throughout the elongated strap 82.

A cooperating second fastening component 86 is at the distal end of the elongated strap 82. The fastening components 84, 84 may be of any type suitable for the intended including, but not limited to cooperating hook-and-loop type fastening components. The elongated strap 82 also may be made of any material suitable for the intended purpose including but not limited to, elastic material, flexible material, or any combinations thereof.

A clamp member 75 is on the same end of the upper connecting member 71 as is the elongated strap 82 and is attached thereto. The clamp member 75 may be of a rigid material and contoured to fit tightly around the second telescoping arm. As such, the clamp member 75 may be attached to the upper connecting member 71 by a suitable hinge 74 as illustrated in the drawings.

The clamp member also may be of an flexible or elastic material and be attached to the upper connecting directly or by way of a hinge 74.

In either event, the clamp member 75 is intended to fit or wrap around and removably and adjustably attach to the second telescoping arm 21 [FIGS. 1, 2, and 3 refer]. There is a protrusion at the distal end of the clamp member 75 which, when the clamp member 75 is fitted or tightly wrapped around the second telescoping arm 21 and brought to the other end of the upper connecting member 71, the swing arm 77 is moved in the direction of Arrow-D, with the aid of the outward extension 80 on the swing arm 77, if necessary, mating the catch 78 of the swing arm 77 with the outward protrusion 76 of the clamp member 75.

As stated above, the clamp member 75 may be made of a rigid contoured material or any other material suitable for the intended purpose including but not limited to, elastic material, flexible material, or any combinations thereof. What is important is that the clamp member 75, when fitted or wrapped around the second telescoping arm 21 is held securely thereat after the catch 78 of the swing arm 77 engages the protrusion 76 of the clamp member 75.

To further aid in the tight clamping and retaining of the second telescoping arm 21 in the upper connecting member 71, there is a flexible insert 57 in the upper connecting member 71 which comes into direct contact with the second telescoping arm 21 as it is placed into th upper connecting member 71 and clamped thereinto. The flexible insert 57 may be of any reasonably flexible or cushion-like material such as, but not limited to, rubber, vinyl, foam, or similar materials suited for the intended purpose.

Once the upper connecting member 71 is attached to, and adjusted on, the second telescoping arm 21, the elongated strap 82 is wrapped around the user 102 in the direction of Arrow-E, threaded into and through the elongated slot 72, and continuing in the direction of Arrow-E, pulled firmly as the second fastening component 86 is pressed onto the cooperating first fastening component 84.

There also is an upstanding post 79 on top of the upper connecting member 71. The upstanding post 79 is structured to accept the hollow bottom of the third arm 31 is a relatively tight-fitting friction-like communication to thereby secure and retain the third arm 31 is that upstanding post 79. This adds greater flexibility to the functionality of the camera stand 10 to permit the user a variety of position modes in operation.

For greater support of the mobile camera stand 10 to the user 102, a lower connecting member 51 removably attaches to the user 102 and onto the third arm 31 of the mobile camera stand 10. It should be noted that the lower connecting member 51 may also attach directly to the second telescoping arm 21 if desired.

The lower connecting member 51 has a body with a back plate 53 extends on one side beyond the body exposing an elongated slot 52. Forward of the slot 52 is a elongated channel 55 having a locking member 54 which when the locking member 54 is rotated [engaged], it [locking member 54] enters into the channel 55. The channel 55 is adapted to receive the third arm 31 and, when the locking member 54 is engaged, it presses against the third arm 31 securely locking it into the channel 55.

An elongated strap 62 is on the other side of the lower connecting member 51. The elongated strap 62 has a first fastening component 64 on one or both sides virtually throughout the elongated strap 62. A cooperating second fastening component 66 is at the distal end of the elongated strap 62. The fastening components 64, 64 may be of any type suitable for the intended including, but not limited to cooperating hook-and-loop type fastening components. The elongated strap 62 also may be made of any material suitable for the intended purpose including but not limited to, elastic material, flexible material, or any combinations thereof.

Similar in operation to the upper connecting member 71, once the lower connecting member 51 is attached to, and adjusted on, the third arm 31 [or second telescoping arm 21 as the case may be], the elongated strap 62 is wrapped around the user 102 in the direction of Arrow-F, threaded into and through the elongated slot 52, and continuing in the direction of Arrow-F, pulled firmly as the second fastening component 66 is pressed onto the cooperating first fastening component 64.

Additionally, as with the upper connecting member 71, there also is an upstanding post 59 on top of the lower connecting member 51. The upstanding post 59 is also structured to accept the hollow bottom of the third arm 31 is a relatively tight-fitting friction-like communication to thereby secure and retain the third arm 31 is that upstanding post 59. This adds even greater flexibility to the functionality of the camera stand 10 to permit the user a variety of position modes in operation.

With each connecting member 51, 71 attached to their respective arm [third arm 31, second telescoping arm 21] and to the user 102, the user 102 has exceptional flexibility of use and adjustment of the camera 101/platform 100, either by pivoting the first telescoping arm 11 forward or backward, extending the first telescoping arm 11 upward or downward, extending the second telescoping arm 21 upward or downward, or adjusting either the upper connecting member 71 or the lower connecting member 51 on the user 102, and any combinations of the above.

The present disclosure includes that contained in the present claims as well as that of the foregoing description. Although this mobile camera stand of the present disclosure has been described in its preferred forms with a certain degree of particularity, it is understood that the present disclosure of the preferred form has been made only by way of example and numerous changes in the details of construction and combination and arrangement of parts and method steps may be resorted to without departing from the spirit and scope of the mobile camera stand of the present disclosure. Accordingly, the scope of the mobile camera stand of the present disclosure should be determined not by the embodiment[s] illustrated, but by the appended claims and their legal equivalents.

Applicant[s] have attempted to disclose all the embodiment[s] of the mobile camera stand of the present disclosure that could be reasonably foreseen. It must be understood, however, that there may be unforeseeable insubstantial modifications to mobile camera stand of the present disclosure that remain as equivalents and thereby falling within the scope of the mobile camera stand of the present disclosure.

What is claimed is:

1. A mobile camera stand comprising:
    (a) a receiver having a receiver top, a receiver bottom with a locking member, and a receiver pivotable section, said receiver pivotable section forward of and between said receiver top and said receiver bottom;
    (b) a first telescoping arm attached to said receiver top, said first telescoping arm having a first pivotable member at its distal end being insertable into a camera platform;
    (c) a second telescoping arm attached to said pivotable section, said second telescoping arm having a second pivotable member at its distal end being insertable into the camera platform; and
    (d) a third arm removably connected to said receiver bottom wherein said third arm has a slot at its top and an aperture adjacent to said slot and wherein said receiver bottom further has an inner protruding member which registers with said slot and said locking member on said receiver bottom aligns with said aperture to lock said third arm securely into said receiver bottom.

2. The mobile camera stand of claim 1 further comprising an adjustable upper connecting member removably connectable to said second telescoping arm, said upper connecting member comprising:
    a back plate having a first end, a second end, and an elongated slot outward of said first end;
    a swing arm on said second end said swing arm having a catch;
    a clamp member attached at its proximal end to the second end of said back plate and having a protrusion at its distal end which after said clamp member is placed around said second telescoping arm said catch of said swing arm engages said protrusion of said clamp member thereby securing said upper connecting member to said second telescoping arm; and an upper elongated strap attached to the second end of said back plate having a first fastening component substantially throughout and having a second fastening component at its distal end in fastening communication with said first fastening component;

whereby said upper elongated strap after placement around a user inserts though said elongated slot and said second fastening component removably attaches to said first fastening component for securing said upper connecting member to the user.

3. The mobile camera stand of claim 2 wherein said swing arm of said upper connecting member has an outward extension to facilitate movement of said swing arm in a fastening or unfastening position to said protrusion of said clamp member.

4. The mobile camera stand of claim 2 wherein said clamp member is comprised of a flexible or elastic material or a combination of both.

5. The mobile camera stand of claim 2 wherein said clamp member is comprised of a substantially rigid material and contoured to fit tightly around said second telescoping arm.

6. The mobile camera stand of claim 2 wherein said first fastening component and said second fastening component are comprised of cooperating hook-and-loop fasteners.

7. The mobile camera stand of claim 2 wherein said first fastening component and said second fastening component are comprised of a flexible or elastic material or a combination of both.

8. The mobile camera stand of claim 2 wherein said third arm has a hollow bottom and said upper connecting member has an upstanding post on its top wherein said upstanding post is adapted to receive the hollow bottom of said third arm.

9. The mobile camera stand of claim 2 further comprising a flexible insert in said upper connecting member to be in communication with said second telescoping arm as said telescoping arm in placed on said upper connecting member and clamped in place thereat for greater securability of said second telescoping arm to said upper connecting member.

10. The mobile camera stand of claim 1 further comprising an adjustable lower connecting member removably attachable to said third arm, said lower connecting member comprising:

a back plate having a first side, a second side, and an elongated slot outward of said first side;

a front channel and locking member into which into which said third arm is removably insertable and securable; and a lower elongated strap attached to the second side of said back plate having a first fastening component substantially throughout and having a second fastening component at its distal end in fastening communication with said first fastening component;

whereby said lower elongated strap after placement around a user inserts though said elongated slot and said second fastening component removably attaches to said first fastening component for securing said lower connecting member to the user.

11. The mobile camera stand of claim 10 wherein said first fastening component and said second fastening component are comprised of cooperating hook-and-loop fasteners.

12. The mobile camera stand of claim 10 wherein said first fastening component and said second fastening component are comprised of a flexible or elastic material or a combination of both.

13. The mobile camera stand of claim 10 wherein said third arm has a hollow bottom and said lower connecting member has an upstanding post on its top wherein said upstanding post is adapted to receive the hollow bottom of said third arm.

* * * * *